United States Patent
Maurice et al.

(10) Patent No.: US 11,717,723 B2
(45) Date of Patent: Aug. 8, 2023

(54) CONNECTION DEVICE WITH IMPROVED HANDLE

(71) Applicant: ZEDEL, Crolles (FR)

(72) Inventors: Alain Maurice, Saint Hilaire du Touvet (FR); Benoît Vuillermoz, Saint-Martin-d'Hères (FR); Christophe Quillard, Eybens (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 17/507,439

(22) Filed: Oct. 21, 2021

(65) Prior Publication Data

US 2022/0143469 A1    May 12, 2022

(30) Foreign Application Priority Data

Nov. 9, 2020 (FR) ...................................... 2011498

(51) Int. Cl.
| | |
|---|---|
| *B61B 12/02* | (2006.01) |
| *F16B 45/02* | (2006.01) |
| *A63B 29/08* | (2006.01) |
| *A63B 29/02* | (2006.01) |
| *A62B 35/00* | (2006.01) |

(52) U.S. Cl.
CPC .............. *A63B 29/08* (2013.01); *A63B 29/02* (2013.01); *F16B 45/021* (2021.05); *A62B 35/0081* (2013.01)

(58) Field of Classification Search
CPC ........ F16B 45/021; F16B 45/02; A63B 29/02; A63B 29/08; A63B 35/0081; A63B 35/0025; A63B 35/0037; A63B 35/0056; A63B 35/0075; F16G 105/15; F16G 105/151; F16G 105/156; F16G 104/113; F16G 104/115
USPC ........................................................ 24/599.1
See application file for complete search history.

(56) References Cited

U.S. PATENT DOCUMENTS

| | | | | |
|---|---|---|---|---|
| 8,985,027 | B2 * | 3/2015 | Brown .................... | A63G 21/20 104/53 |
| 9,943,710 | B1 * | 4/2018 | Cooper .............. | A62B 35/0075 |
| D869,937 | S   * | 12/2019 | Walker .......................... | D8/356 |
| 2015/0367148 | A1 * | 12/2015 | Caude ...................... | A62B 1/18 24/115 A |

FOREIGN PATENT DOCUMENTS

| | | | | |
|---|---|---|---|---|
| KR | 101283056 | B1 * | 7/2013 | |
| WO | WO-2014123750 | A1 * | 8/2014 | ............. A63G 21/20 |

* cited by examiner

*Primary Examiner* — Jack W Lavinder
(74) *Attorney, Agent, or Firm* — Oliff PLC

(57) ABSTRACT

A connection device comprises a connector forming a ring with an open position and a closed position. A handle is fixed to the connector and has two extensions receiving a user's hands. The handle defines a tube extending in a first direction and a through hole arranged to pass through the tube perpendicularly to the first direction. A first end of a wire member forms a loop fixed to the connector in the tube. The second end of the wire member is fixed to the user. The connector passes through the through hole and the loop to fix the handle and the wire member to the connector.

10 Claims, 2 Drawing Sheets

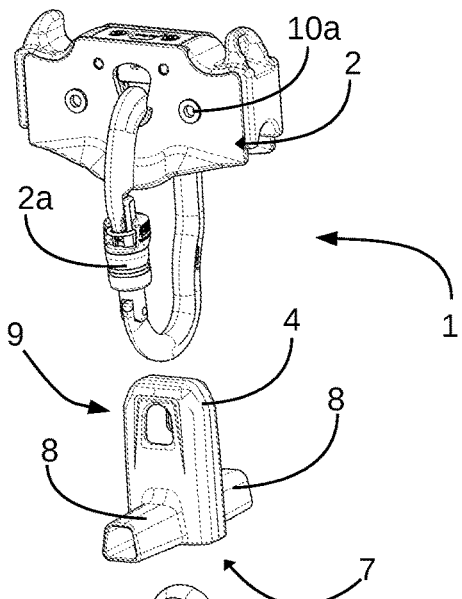
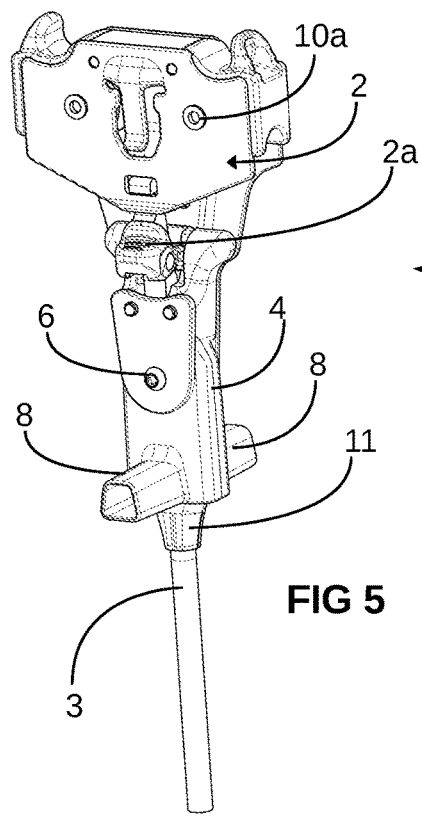
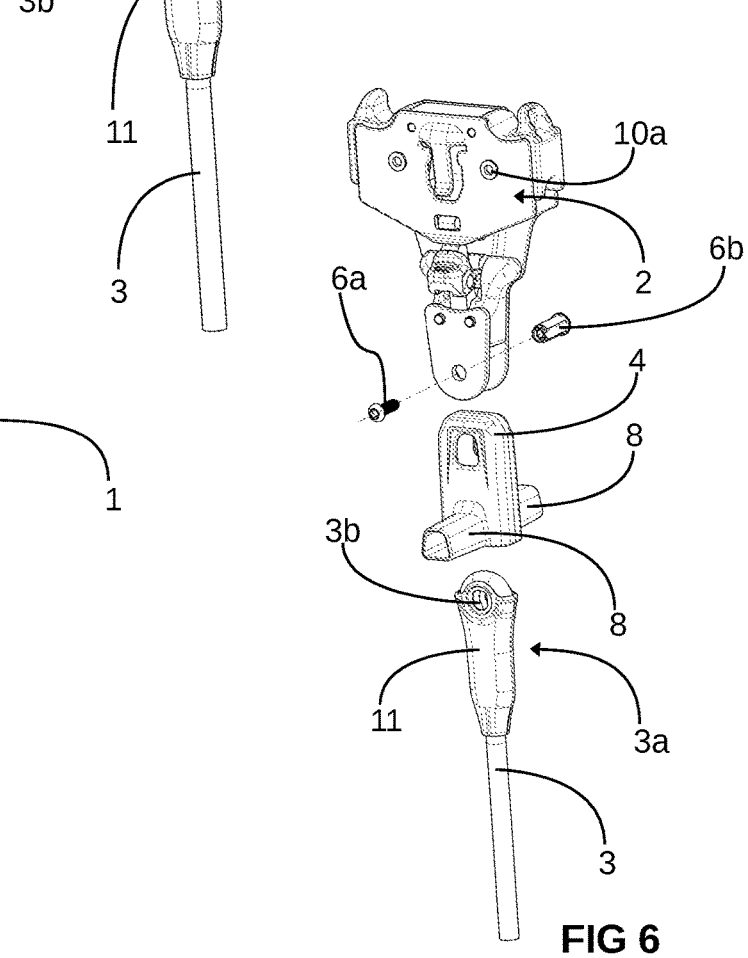
FIG 4
FIG 5
FIG 6

CONNECTION DEVICE WITH IMPROVED HANDLE

BACKGROUND OF THE INVENTION

The invention relates to a connection device with a handle.

PRIOR ART

In a wide range of activities, a user is secured to an anchor point, to a lifeline or to another belay means via a wire member terminated by a connector, typically a lanyard terminated by a carabiner. When a user uses a zip line, the connector is fixed to a pulley. To prevent the user's hands from being near to the cable and the sheaves, a pulley having a handle is proposed. The handle has two extensions which are fitted in fixed manner on the body of the pulley. The user grips the handle during the descent. The handle also enables the user to keep his balance to avoid turning when performing the descent.

In a large number of configurations, the handle is not necessary. The handle may also be a source of incidents as certain people do not use the handle as a place for placing their hands during the descent but as a suspension point to perform one or more pull-ups which modifies the interaction of the pulley with the cable or may even result in derailment of the pulley when the user lets go of the handle violently. It also happens that the user tries to support his weight with his arms instead of letting himself be supported by his lanyard.

It is therefore preferable to provide a pulley equipped with a handle when this is necessary and a pulley without a handle in the other cases. However, for an operator, it is not worthwhile having two sets of pulleys, with and without a handle, as this increases costs. This problem is not exclusive to pulleys of zip lines and can be found in other fields. There is therefore an advantage in providing a removable handle. This results in removal of the handle posing a problem of certification and maintenance which complicates removal of the handle or even makes this impossible.

The document US 2015/0059611 divulges a pulley provided with two flanges facing one another and a handle. The handle is in the form of a rod passing through two holes formed in the two flanges. The pulley has a seat fitted at the end of a rope fixed to a tube installed between the two flanges. The tube receives the shaft of the handle.

OBJECT OF THE INVENTION

One object of the invention consists in providing a connection device having a removable handle, the handle being easy to handle and not modifying the distribution of forces between the user and the anchor point. For this purpose, the connection device comprises:
- a connector forming a ring, the connector having an open position where the ring is open and a closed position where the ring is closed,
- a handle fixed to the connector, the handle having two extensions designed to receive a user's hands;
- a wire member having a first end fixed to the connector and a second end designed to be secured to the user.

The connection device is remarkable in that:
the first end of the wire member forms a loop,
the handle is fitted removable with respect to the connector,
the handle defines a tube extending in a first direction and a through hole arranged to pass through the tube perpendicularly to the first direction, the first end of the wire member being fixed to the connector in the tube, the connector passing through the through hole and the loop to fix the handle and the wire member to the connector.

In one development, the tube is open at one end only.

Advantageously, the extensions extend over a distance of less than 5 cm from the tube.

In another development, the handle has a lower breaking strength than the breaking strength of the wire member along the longitudinal axis of the wire member.

Preferentially, the wire member is fitted removable with respect to the handle.

In a particular embodiment, the connector is chosen from a carabiner, a shackle and a quick link.

Advantageously, the connection device comprises a pulley designed to run on a cable, the connector being fixed to the pulley, the wire member being connected to the pulley by means of the connector only.

In a preferential configuration, the connector is fitted removable from the pulley.

In a particular embodiment, the connection device comprises a pulley designed to run on a cable, the connector comprising a removable rotation shaft, the handle and wire member being fitted on the rotation shaft, the rotation shaft being fitted in removable manner.

It is a further object of the invention to provide a method for manufacturing a connection device that is easy to implement to install a pulley on a connector.

This result tends to be achieved by means of a method for manufacturing comprising the following steps:
- providing a connector, a wire member and a handle, the handle defining a tube extending in a first direction and a through hole arranged to pass through the tube in a second direction perpendicular to the first direction;
- installing the wire member in the tube, a loop of the wire member being facing the through hole;
- passing the connector through the through hole and the loop to fix the wire member and the handle with the connector.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which:

FIG. 4 schematically represents an exploded view of the connection device according to FIG. 3, the carabiner being fitted in the pulley;

FIG. 5 schematically represents a three-quarter view of a pulley with an integrated connector, a lanyard and a handle being fitted on the connector;

FIG. 6 schematically represents an exploded view of the connection device according to FIG. 5.

DESCRIPTION OF THE EMBODIMENTS

Figure 1:
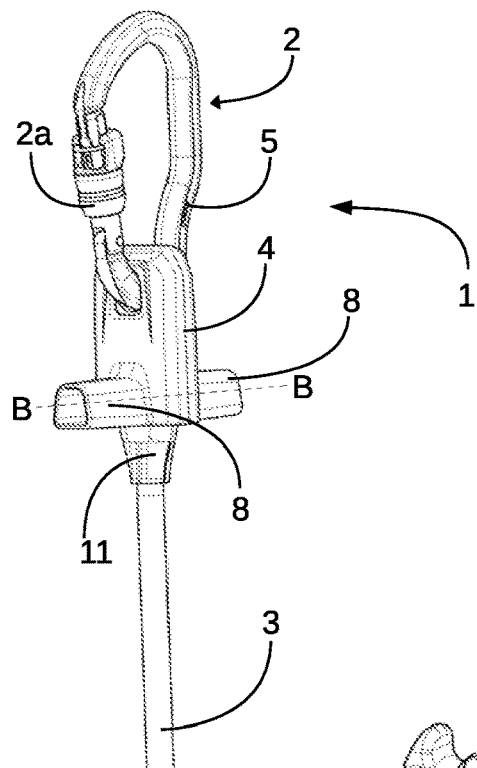
FIG. 1 schematically illustrates a three-quarter view of a connection device having a lanyard and a handle installed on a carabiner.

FIGS. 1 to 6 illustrate a connection device 1 comprising a connector 2, a wire member 3 and a handle 4. Wire member 3 has a first end 3a fixed to connector 2 and a second end designed to be secured to the user. In this way, the weight of the user secured to wire member 3 is transmitted to connector 2. Wire member 3 can be formed by any suitable element, for example a lanyard or a rope. First end 3a of wire member 3 defines a loop 3b. Connector 2 passes through loop 3b to provide the mechanical connection between the user and connector 2.

Connector 2 forms a ring. Connector 2 has an open position where the ring is open and a closed position where the ring is closed. Connector 2 is designed to be fixed directly or indirectly to an anchor point. The anchor point can be a lifeline or a zip line cable. Connector 2 can be fixed to a pulley itself fixed to a cable (not shown). Connector 2 has a finger 2a that is fitted movable to close or open the ring.

Figure 2:
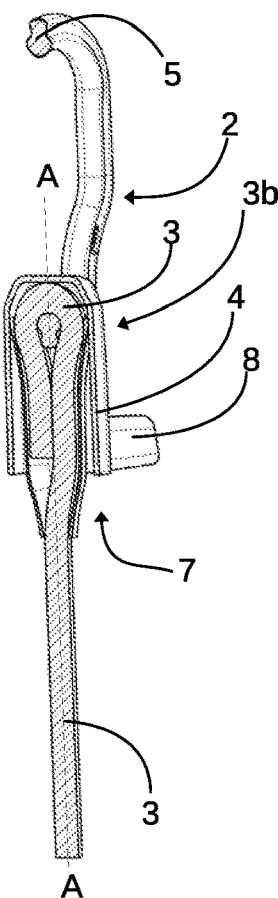
FIG. 2 schematically represents a cross-sectional view of the connection device illustrated in FIG. 1.

In the embodiment illustrated in FIGS. 1 and 2, connector 2 is a carabiner but it is also possible to use a quick link or a shackle. In the embodiment illustrated in FIGS. 1, 2, 3 and 4, connector 2 has a body 5 that forms the ring and body 5 passes through the loop of the wire member to make the mechanical connection. In the embodiment illustrated in FIGS. 5 and 6, the connector has a rotation shaft 6 that is fitted in removable manner. Rotation shaft 6 can be formed by two elements 6a, 6b that collaborate to fix rotation shaft 6 on connector 2.

Handle 4 defines a tube 7. Tube 7 is open at a first end. Depending on the configurations, tube 7 is open or closed at the second end. Wire member 3 is fitted inside tube 7. Tube 7 extends in a first direction AA that corresponds substantially to the longitudinal axis of wire member 3.

Handle 4 has two extensions 8 that are designed to receive the user's hands. The two extensions 8 extend in a second direction BB perpendicular to first direction AA. Depending on the configurations, the two extensions 8 can be hollow or solid. In the illustrated embodiment, the distal ends of extensions 8 with respect to tube 7 are open but it is possible to have closed ends.

Handle 4 also defines a through hole 9 that is configured to pass through tube 7 in a direction perpendicular to first direction AA. Through hole 9 is arranged so that connector 2 passes through tube 7 and also passes through loop 3b of first end 3a of wire member 3.

First end 3a of wire member 3 is inserted in tube 7 until loop 3b is facing through hole 9. Connector 2 is then inserted in through hole 9 and loop 3b to make two distinct mechanical connections, a first mechanical connection between connector 2 and wire member 3 and a second mechanical connection between connector 2 and handle 4.

When the user is suspended via wire member 3 fixed to connector 2, no force is applied on handle 4. In other words, handle 4 does not play any role in suspension of the user by means of connector 2. This specific configuration enables handle 4 to be fitted and removed without modifying the distribution of the mechanical forces between wire member 3 and connector 2. This configuration facilitates certification of the assembly as handle 4 does not play any role in stress take-up. Installation of handle 4 does not require a new certification phase. For the operator, handle 4 can be fitted and removed between different connectors and/or different pulleys which makes its operation easier to manage.

Through hole 9 is represented by two holes passing through the side wall of tube 7 and separated by wire member 3

In the embodiment illustrated in FIGS. 1 to 4, connector 2 has a body 5 that passes through the tube and the loop passing through the through hole. In the embodiment illustrated in FIGS. 5 and 6, the rotation shaft passes through the loop and the through hole.

Handle 4 is fitted removable with respect to connector 2 to match the configuration of connector 2 with the operator's requirements.

To limit risky behaviour, it is particularly advantageous to use extensions 8 that extend over a distance of less than 5 cm from the side wall defining tube 7. By reducing the length of extensions 8, it is more difficult for a user to pull on his arms to move his centre of gravity towards the attachment point between wire member 3 and connector 2. The user then uses extensions 8 as an attachment point to apply a torque preventing his chest from rotating and not as an attachment point to support his weight instead of wire member 3.

It is also advantageous to provide a handle 4 that has a lower breaking strength than the breaking strength of wire member 3 in its main direction. It is further advantageous to provide a handle that has a lower breaking strength than the breaking strength of connector 2.

In the different illustrated embodiments, the axis of rotation of handle 4 with respect to connector 2 is parallel to the longitudinal axis of extensions 8 from tube 7. However, offset of the two axes is possible as is perpendicular assembly of the two axes.

In the preferential embodiment illustrated, the attachment point between wire member 3 and connector 4 is located under the wrists when the user is suspended with the wire member.

Handle 4 is advantageously manufactured in monolithic manner and preferentially from plastic material.

Figure 3:
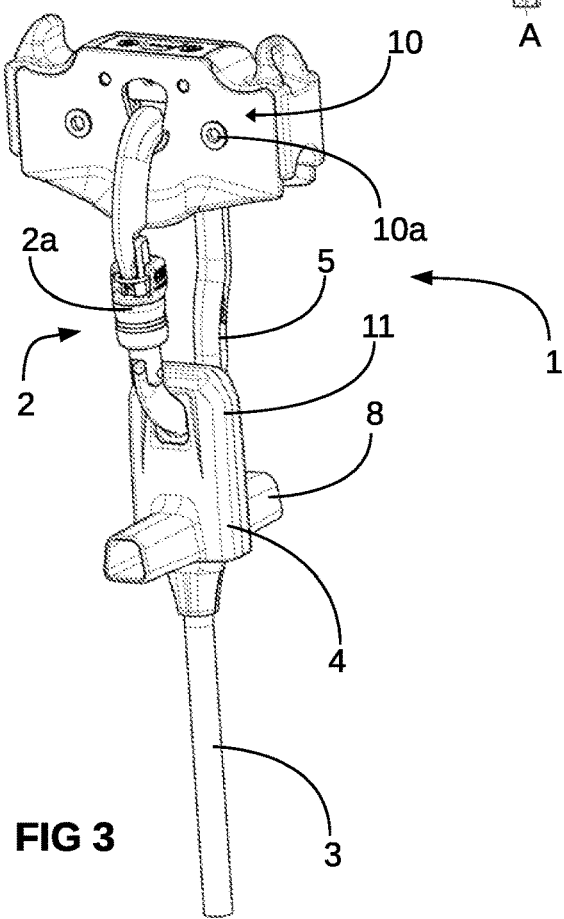
FIG. 3 schematically represents a three-quarter view of a connection device having a lanyard and a handle installed on a carabiner, the carabiner being fitted in a pulley.

FIGS. 1 and 2 illustrate a configuration where connection device 1 is formed by a connector 2 that is a carabiner, a handle fixed to the carabiner and a wire member 3 fixed to the carabiner inside tube 7 defined by handle 4. In this configuration, connector 2 can be fixed to an anchor point without having to act on handle 4 and wire member 3. To extract handle 4, it is necessary to open connector 2 and to then remove handle 4 and wire member 3. Wire member 3 can subsequently be re-installed. Connector 2 can be fitted on a pulley as represented in FIG. 3. FIG. 4 illustrates a view where the handle and wire member 3 have been separated from connector 2.

In another embodiment, connector 2 is fixed to a pulley 10. Through hole 9 and loop 3b can be fitted on connector 2 without separating connector 2 and pulley 10.

In the embodiment illustrated in FIGS. 5 and 6, connector 2 is manufactured in monolithic manner with pulley 10. As body 5 of connector 2 defining the open or closed ring has a specific shape that is more complex than that of FIG. 4, it is advantageous to install a removable rotation shaft 6 on connector 2.

In the embodiments illustrated in FIGS. 3 to 6, pulleys 10 are tandem pulleys, i.e. pulleys with two sheaves arranged in line along the longitudinal axis of the cable on which pulley 10 is to run. Each sheave is mounted on a rotation shaft 10a.

The specific configuration of handle 4 is particularly advantageous as it enables a connector 2 that is already in use with an operator to be functionalised without having to change pulley 10 and possibly without having to modify connector 2.

In the illustrated configurations, tube 7 defines a ring around wire member 2 in a plane perpendicular to direction AA. It is preferable for the cross-section of the tube in the plane perpendicular to direction AA to be different from a circle, preferably of rectangular cross-section and possibly with a rounded edge.

In the illustrated embodiments, loop 3b is formed by a fold. The loop is formed by two branches of wire member 3. Preferentially, the loop is defined by a seam between the two branches. It is preferable for the loop to be covered by a protection 11 defining the shape of the loop to make it easier to insert in tube 7.

The invention claimed is:

1. A connection device comprising:
   a connector forming a ring, the connector having an open position where the ring is open and a closed position where the ring is closed;
   a handle fixed to the connector, the handle having two extensions designed to receive a user's hands;
   a wire member having a first end fixed to the connector and a second end designed to be secured to the user, the first end of the wire member forming a loop;
   wherein the handle is fitted removable with respect to the connector, and
   wherein the handle defines a tube extending in a first direction and a through hole arranged to pass through the tube perpendicularly to the first direction, the first end of the wire member being fixed to the connector in the tube, the connector passing through the through hole and the loop to fix the handle and the wire member to the connector.

2. The connection device according to claim 1, wherein the tube is open at one end only.

3. The connection device according to claim 1, wherein each of the two extensions extend over a distance of less than 5 cm from the tube.

4. The connection device according to claim 1, wherein the handle present has a lower breaking strength than a breaking strength of the wire member along a longitudinal axis of the wire member.

5. The connection device according to claim 1, wherein the wire member is fitted removable with respect to the handle.

6. The connection device according to claim 1, wherein the connector is a carabiner.

7. The connection device according to claim 1, comprising a pulley designed to run on a cable, the connector being fixed to the pulley, the wire member being connected to the pulley by means of the connector only.

8. The connection device according to claim 7, wherein the connector is fitted removable from the pulley.

9. The connection device according to claim 1, comprising a pulley designed to run on a cable, the connector comprising a removable rotation shaft, the handle and wire member being fitted on the rotation shaft, the rotation shaft being fitted in removable manner.

10. A method for fabricating a connection device according to claim 1 comprising the following steps:
    providing a connector, a wire member and a handle, the handle defining a tube extending in a first direction and a through hole arranged to pass through the tube in a second direction perpendicular to the first direction;
    installing the wire member in the tube, a loop of the wire member being facing the through hole;
    passing the connector through the through hole and the loop to fix the wire member and the handle with the connector.

* * * * *